United States Patent
Khan et al.

(10) Patent No.: US 8,023,507 B2
(45) Date of Patent: Sep. 20, 2011

(54) CARD TO CARD COMMUNICATIONS IN VOICE AND DATA COMMUNICATIONS SYSTEMS

(75) Inventors: Parvez Khan, Reading, MA (US); Hamed Eshraghian, Lexington, MA (US)

(73) Assignee: Starent Networks LLC, Wilmington, DE (US)

( * ) Notice: Subject to any disclaimer, the term of this patent is extended or adjusted under 35 U.S.C. 154(b) by 0 days.

(21) Appl. No.: 12/482,910

(22) Filed: Jun. 11, 2009

(65) Prior Publication Data

US 2010/0027548 A1 Feb. 4, 2010

Related U.S. Application Data

(63) Continuation of application No. 10/639,783, filed on Aug. 12, 2003.

(60) Provisional application No. 60/403,086, filed on Aug. 13, 2002.

(51) Int. Cl.
*H04L 12/28* (2006.01)
*G06F 13/36* (2006.01)

(52) U.S. Cl. ........ 370/389; 370/359; 370/419; 370/398; 710/105; 710/315

(58) Field of Classification Search ................. 370/359, 370/398, 419, 389; 710/105, 315
See application file for complete search history.

(56) References Cited

U.S. PATENT DOCUMENTS

| | | | |
|---|---|---|---|
| 4,070,648 A | 1/1978 | Mergenthaler et al. | |
| 4,451,884 A | 5/1984 | Heath et al. | |
| 4,656,645 A | 4/1987 | Kaneko et al. | |
| 4,914,650 A | 4/1990 | Sriram | |
| 5,361,249 A | 11/1994 | Monastra et al. | |
| 5,436,886 A | 7/1995 | McGill et al. | |
| 5,495,478 A * | 2/1996 | Wilkinson et al. | 370/399 |
| 5,526,484 A | 6/1996 | Casper et al. | |
| 5,583,867 A | 12/1996 | Poole | |
| 5,594,866 A | 1/1997 | Nugent | |
| 5,631,908 A | 5/1997 | Saxe | |
| 5,640,605 A | 6/1997 | Johnson et al. | |
| 5,740,176 A | 4/1998 | Gupta et al. | |
| 5,771,396 A | 6/1998 | Arnold | |
| 5,802,052 A | 9/1998 | Venkataraman | |
| 5,854,840 A * | 12/1998 | Cannella, Jr. | 380/268 |

(Continued)

FOREIGN PATENT DOCUMENTS

EP  0 944 288  9/1999

(Continued)

OTHER PUBLICATIONS

English Translation of Notice for Rejection issued for corresponding Japanese Patent Application No. 2004-528133.

(Continued)

*Primary Examiner* — Rafael Perez Gutierrez
*Assistant Examiner* — Allahyar Kasraian
(74) *Attorney, Agent, or Firm* — Wilmer Cutler Pickering Hale and Dorr LLP (57) ABSTRACT

A data and voice communication system includes communication between a line card and an accelerator card. Voice, data, and control traffic is received from the line card and is transmitted to the accelerator card via a physical link having separate voice, data, and control logical channels. The separate voice, data, and control logical channels are represented by labeled data packets.

19 Claims, 10 Drawing Sheets

U.S. PATENT DOCUMENTS

| | | | |
|---|---|---|---|
| 5,946,323 | A | 8/1999 | Eakins et al. |
| 5,982,746 | A | 11/1999 | Hanson et al. |
| 6,052,751 | A | 4/2000 | Runaldue et al. |
| 6,072,794 | A | 6/2000 | Kang et al. |
| 6,108,692 | A | 8/2000 | Van Seters et al. |
| 6,137,807 | A | 10/2000 | Rusu et al. |
| 6,145,024 | A | 11/2000 | Maezawa et al. |
| 6,172,972 | B1 | 1/2001 | Birdwell et al. |
| 6,351,466 | B1 | 2/2002 | Prabhakar et al. |
| 6,434,155 | B1 * | 8/2002 | Jones et al. .......... 370/398 |
| 6,463,065 | B1 | 10/2002 | Petersen et al. |
| 6,522,342 | B1 | 2/2003 | Gagnon et al. |
| 6,556,571 | B1 | 4/2003 | Shahrier et al. |
| 6,614,483 | B1 | 9/2003 | Lee et al. |
| 6,687,247 | B1 | 2/2004 | Wilford et al. |
| 6,691,183 | B1 | 2/2004 | Ryan, Jr. |
| 6,697,368 | B2 | 2/2004 | Chang et al. |
| 6,721,565 | B1 | 4/2004 | Ejzak et al. |
| 6,760,327 | B1 * | 7/2004 | Manchester et al. .......... 370/364 |
| 6,763,025 | B2 | 7/2004 | Leatherbury et al. |
| 6,781,993 | B1 | 8/2004 | Takechi et al. |
| 6,795,431 | B2 * | 9/2004 | Endo ............................ 370/352 |
| 6,798,744 | B1 | 9/2004 | Loewen et al. |
| 6,801,975 | B1 | 10/2004 | Young |
| 6,894,970 | B1 | 5/2005 | McDermott, III et al. |
| 6,910,092 | B2 | 6/2005 | Calvignac et al. |
| 7,032,135 | B2 | 4/2006 | Harel et al. |
| 7,065,094 | B2 | 6/2006 | Petersen et al. |
| 7,079,485 | B1 | 7/2006 | Lau et al. |
| 7,093,289 | B2 * | 8/2006 | McElroy et al. ................. 726/13 |
| 7,099,352 | B1 | 8/2006 | Ferguson et al. |
| 7,120,164 | B2 | 10/2006 | Le |
| 7,130,276 | B2 * | 10/2006 | Chen et al. .................... 370/249 |
| 7,139,270 | B1 * | 11/2006 | Fatehi et al. .................. 370/392 |
| 7,304,952 | B2 | 12/2007 | Scholten |
| 7,324,500 | B1 | 1/2008 | Blackmon et al. |
| 7,536,473 | B2 | 5/2009 | Ajanovic et al. |
| 7,593,399 | B2 * | 9/2009 | Nishihara .................... 370/389 |
| 7,636,358 | B1 * | 12/2009 | Manchester et al. .......... 370/394 |
| 2002/0064149 | A1 | 5/2002 | Elliott et al. |
| 2002/0080737 | A1 | 6/2002 | Koo et al. |
| 2002/0093969 | A1 | 7/2002 | Lin et al. |
| 2002/0116501 | A1 * | 8/2002 | Ho et al. ....................... 709/227 |
| 2002/0163924 | A1 | 11/2002 | Kim |
| 2002/0191241 | A1 * | 12/2002 | Emery et al. .................. 359/109 |
| 2003/0002505 | A1 * | 1/2003 | Hoch et al. .................... 370/392 |
| 2003/0069915 | A1 | 4/2003 | Clough et al. |
| 2003/0115380 | A1 * | 6/2003 | Ajanovic et al. ................. 710/1 |
| 2003/0185212 | A1 | 10/2003 | Kelly et al. |
| 2003/0215232 | A1 | 11/2003 | Jahn et al. |
| 2003/0217235 | A1 | 11/2003 | Rowlands |
| 2004/0032827 | A1 | 2/2004 | Hill et al. |
| 2004/0044820 | A1 | 3/2004 | Ajanovic et al. |
| 2004/0202179 | A1 | 10/2004 | Tan et al. |
| 2004/0233922 | A1 | 11/2004 | Van Wageningen et al. |
| 2005/0047334 | A1 | 3/2005 | Paul et al. |
| 2005/0201387 | A1 * | 9/2005 | Willis ....................... 370/395.52 |
| 2005/0216609 | A1 | 9/2005 | Singla et al. |
| 2005/0226148 | A1 | 10/2005 | Assarpour |
| 2005/0281211 | A1 | 12/2005 | Takabatake et al. |

FOREIGN PATENT DOCUMENTS

| | | |
|---|---|---|
| EP | 0 975 187 | 1/2000 |
| JP | 10-271136 | 10/1998 |
| JP | 2000-032062 | 1/2000 |
| JP | 200041053 | 2/2000 |
| JP | 2000-252988 | 9/2000 |
| JP | 2001-217836 | 8/2001 |
| JP | 2002118868 | 4/2002 |
| WO | WO-00/76260 A1 | 12/2000 |
| WO | WO-01/05086 | 1/2001 |
| WO | WO-01/30037 | 4/2001 |
| WO | WO-01/65783 | 9/2001 |
| WO | WO-01/67694 | 9/2001 |

OTHER PUBLICATIONS

Parulkar et al., "AITPM: A Strategy for Integrating IP with ATM," Computer Communication Review, Association for Computing Machinery, vol. 25(4), pp. 49-58 (1995).

CSIX: "CSIX-L1 Common Switch Interface Specification-L1" Internet Article, Online, (May 8, 2000), pp. 1-63, Palo Alto, CA USA.

File History for U.S. Appl. No. 10/859,783, filed Jun. 3, 2004.

File History for U.S. Appl. No. 12/395,457, filed Feb. 27, 2009.

Rathgeb, "Redundancy Concepts for a Large ATM Switching Node," *International Switching Symposium*, vol. 1, pp. 425-433 (1977).

* cited by examiner

| STARCHANNEL | |
|---|---|
| Serial Link A | Serial Link B |
| K28.0 | K28.0 |
| K28.0 | K28.0 |
| STARCell Header Byte1 | STARCell Header Byte2 |
| STARCell Header Byte 3 | STARCell Header Byte 4 |
| STARCell Header Byte 5 | STARCell Header Byte 6 |
| STARCell Header 7 | STARCell Header Byte 8 |
| Payload Byte 1 | Payload Byte 2 |
| Payload Byte 3 | Payload Byte 4 |
| …. | … |
| Payload byte N | PAD if needed |
| PAD if needed | PAD if needed |
| PAD | PAD |
| STARCell Trailer Byte 1 | STARCell Trailer Byte 2 |
| K28.2 | K28.2 |
| K28.2 | K28.2 |

FIG. 6

| Byte Number | Description |
|---|---|
| 1/2 | STARCell header |
| 3/4 | STARCell header |
| 5/6 | STARCell header |
| 7/8 | STARCell header |
| 5/6 | AAAA |
| 7/8 | 5555 |
|  |  |
| 37/38 | AAAA |
| 39/40 | 5555 |
| 41/42 | PAD |
| 43/44 | CRC-16 |

| Byte Number | Bits | Description |
|---|---|---|
| 1 | 7 | 1: Remote interface is asserting interrupt<br>0: No interrupt |
| 1 | 6 | 0: Normal Operation<br>1: Cell switched back to other Line card. |
| 1 | 5:4 | STARCell Payload Type<br>00 – Packet<br>01 – ATM cell<br>10 – TDM<br>11 – Reserved |
| 1 | 3 | Source FOCUS bus address<br>0: Cell transmitted by IQ2000<br>1: Cell transmitted by SFC FPGA |
| 1 | 2:0 | STARCell Type<br>000 Idle<br>001 Middle of packet<br>010 End of packet, aborted<br>011 End of packet, good<br>100 Reserved<br>101 Start of packet<br>110 STARChannel Control Cell<br>111 Start and end of packet, good |
| 2 | 7:0 | Payload Length: Payload length is the number of bytes in the payload of the message excluding any padding (which is inserted between payload and CRC-16 field). For the data/control STARCells, the value 1-120 bytes are supported. |
| 3 | 7 | Reserved |
| 3 | 6:4 | Channel #: STARCells support channel 0-7. This corresponds to the physical port on the Line Card. |
| 3 | 3 | Destination FOCUS bus address<br>0 = IQ2000 Focus Interface on PAC<br>1 = Switch Fabric FPGA Focus interface on PAC |
| 3 | 2:0 | Reserved |
| 4 | 7:0 | Reserved |
| 5 | 7:0 | Reserved |
| 6 | 7:0 | Reserved |
| 7 | 7:0 | Reserved |
| 8 | 7:0 | CRC-8 on the header (X8+X5+X2+1) |

| Byte Number | Description |
|---|---|
| 1/2 | STARCell header |
| 3/4 | STARCell header |
| 5/6 | STARCell header |
| 7/8 | STARCell header |
| 9 | Command/Status<br><br>Bits 7:4 : BURST LENGTH Number of registers to access starting at Register Start Address. Maximum number of registers that can be accessed in a burst is equal to 15.<br>Bit 3: Reserved<br>Bit 2: BURST ACESS:<br>Bit 1: REQ/ACK When set indicates a new aux control request when reset indicates the response to an aux control request<br>Bit 0: Set for register reads, clear for register writes |
| 10 | Register Start Address [23:16] |
| 11 | Register Start Address [15:8] |
| 12 | Register Start Address [7:0] |
| 13 | Write/Read Data [31:24] at Start Address |
| 14 | Write/Read Data [23:16] at Start Address |
| 15 | Write/Read Data [15:8] at Start Address |
| 16 | Write/Read Data [7:0] at Start Address |
| ... | ... |
| ... | ... |
| ... | ... |
| ... | ... |
| 37 | Write/Read Data [31:24] at Start Address+7 |
| 38 | Write/Read Data [23:16] at Start Address+7 |
| 39 | Write/Read Data [15:8] at Start Address+7 |
| 40 | Write/Read Data [7:0] at Start Address+7 |
| 41 | PAD |
| 42 | PAD |
| 43 | CRC-16[15:8] |
| 44 | CRC-16 [7:0] |

CARD TO CARD COMMUNICATIONS IN VOICE AND DATA COMMUNICATIONS SYSTEMS

CROSS-REFERENCE TO RELATED APPLICATIONS

This application is a continuation of pending U.S. patent application Ser. No. 10/639,783 filed on Aug. 12, 2003, entitled "Communicating in Voice and Data Communications Systems;" which claims the benefit of U.S. Provisional Application Ser. No. 60/403,086 entitled "CARD TO CARD COMMUNICATION" filed on Aug. 13, 2002, each of which is hereby incorporated by reference herein in their entireties.

BACKGROUND

This invention relates to communicating in voice and data communications systems.

In a communications system, devices or subsystems may communicate via different methods. For example, a first pair of subsystems may be configured to communicate back and forth in time division multiplex (TDM) mode and another pair of subsystems may be configured to communicate back and forth using packet data. In a typical wireless communication system, simple circuit connections or packet-data transport provide limited value in a next generation network.

Although the particular application may vary, the components of a wireless communication system are generally similar, as described in more detail below. For example, a wireless communication system usually includes a radio terminal or mobile station, a radio base station, a switch or network control device, often referred to as a mobile telephone switching office (MTSO), and a network to which the wireless communications system provides access, such as the Public Switched Telephone Network (PSTN).

The various wireless communication applications use any of multiple modulation techniques for transmitting information to efficiently utilize the available frequency spectrum. For example, frequency division multiple access (FDMA), time division multiple access (TDMA), and code division multiple access modulation techniques are used to build high-capacity multiple access systems. Telecommunication systems designed to communicate with many mobile stations occupying a common radio spectrum are referred to as multiple access systems.

For example, in an FDMA analog cellular system, such as an AMPS analog cellular radio system, the available frequency spectrum is divided into a large number of radio channels, e.g., pairs of transmit and receive carrier frequencies, each of which corresponds to a message transmission channel. The bandwidth of each transmit and receive frequency channel is narrowband, generally 25-30 kHz. Thus, the FDMA system permits information to be transmitted in a bandwidth comparable to the bandwidth of the transmitted information, such as a voice signal. The cellular service area in the FDMA system is generally divided into multiple cells, each cell having a set of frequency channels selected so as to help reduce co-channel interference between cells.

Frequency division is often combined with time division so that transmission circuits are distinguished in both the frequency and time domain, e.g., in a FD/TDMA system. In a digital FD/TDMA (commonly referred to as TDMA) cellular system, a narrowband frequency channel is reformatted as a digital transmission path which is divided into a number of time slots. The data signals from different calls are interleaved into assigned time slots and sent out with a correspondingly higher bit rate, the time slot assigned to each mobile station being periodically repeated. Although the TDMA bandwidth may be somewhat larger than the FDMA bandwidth, a bandwidth of approximately 30 kHz is generally used for AMPS-D digital TDMA cellular systems.

Another approach to cellular multiple access modulation is CDMA. CDMA is a spread spectrum technique for transmitting information over a wireless communication system in which the bandwidth occupied by the transmitted signal is significantly greater than the bandwidth required by the baseband information signal (e.g., the voice signal). Thus, CDMA modulation spectrally spreads a narrowband information signal over a broad bandwidth by multiplex modulation, using a codeword to identify various signals sharing the same frequency channel. Recognition of the transmitted signal takes place by selecting the spectrally-coded signals using the appropriate codeword. In contrast to the narrowband channels of approximately 30 kHz used in FDMA and TDMA modulation techniques, a CDMA system generally employs a bandwidth of approximately 1.25 MHz or greater.

Figure 1:
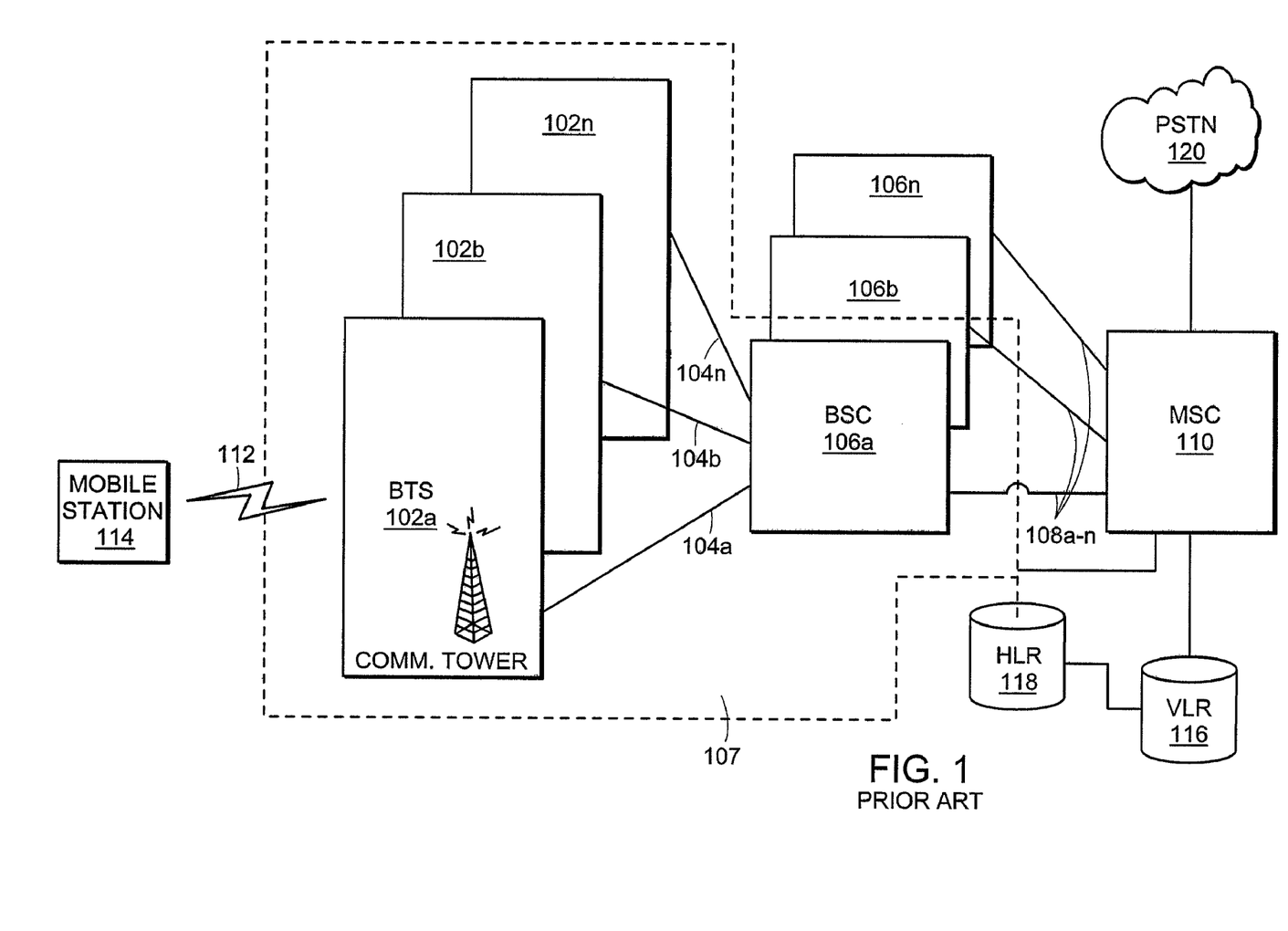
FIGS. 1-2, 3A-3B, 4 are block diagrams of communications systems.

Typically, the mobile communication systems described above are arranged hierarchically such that a geographical "coverage area" is partitioned into a number of smaller geographical areas called "cells." Referring to FIG. 1, each cell is preferably served by a Base Transceiver Station ("BTS") 102a. Several BTS 102a-n are centrally administered via fixed links 104a-n by a Base Station Controller ("BSC") 106a. The BTSs and BSC are sometimes collectively referred to as the Base Station Subsystem ("BS") 107. Several BSCs 106b-n may be centrally administered by a Mobile Switching Center ("MSC") 110 via fixed links 108a-n.

MSC 110 acts as a local switching exchange (with additional features to handle mobility management requirements, discussed below) and communicates with the phone network ("PSTN") 120 through trunk groups. U.S. mobile networks include a home MSC and a serving MSC. The home MSC is the MSC corresponding to the exchange associated with a Mobile Subscriber (also referred to above as a mobile station or "MS") 114; this association is based on the phone number, such as the area code, of the MS. Examples of an MS include a hand-held device such as a mobile phone, a PDA, a 2-way pager, or a laptop computer, or Mobile Unit Equipment, such as a mobile unit attached to a refrigerator van or a rail car, a container, or a trailer.

The home MSC is responsible for a Home Location Register ("HLR") 118 discussed below. The serving MSC, on the other hand, is the exchange used to connect the MS call to the PSTN. Consequently, sometimes the home MSC and serving MSC functions are served by the same entity, but other times they are not (such as when the MS is roaming). Typically, a Visiting Location Register ("VLR") 116 is co-located with the MSC 110 and a logically singular HLR is used in the mobile network (a logically singular HLR may be physically distributed but is treated as a single entity). As will be explained below, the HLR and VLR are used for storing subscriber information and profiles.

Radio channels 112 are associated with the entire coverage area. As described above, the radio channels are partitioned into groups of channels allocated to individual cells. The channels are used to carry signaling information to establish call connections and related arrangements, and to carry voice or data information once a call connection is established.

Mobile network signaling has at least two significant aspects. One aspect involves the signaling between an MS and the rest of the network. In the case of 2G ("2G" is the industry term used for "second generation") and later technology, this signaling concerns access methods used by the MS (such as TDMA or CDMA), pertaining to, for example, assignment of radio channels and authentication. A second aspect involves the signaling among the various entities in the mobile network, such as the signaling among the MSCs, BSCs, VLRs, and HLRs. This second part is sometimes referred to as the Mobile Application Part ("MAP") especially when used in the context of Signaling System No. 7 ("SS7"). SS7 is a common channel signaling system by which elements of the telephone network exchange information, in the form of messages.

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (described below) to determine whether the MS 114 is allowed the requested service. The serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to an MS 114, (assuming that the call originates from the PSTN 120) the PSTN user dials the MS's associated phone number. At least according to U.S. standards, the PSTN 120 routes the call to the MS's home MSC (which may or may not be the MSC serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are set up.

During a call, the BS 107 and MS 114 may cooperate to change channels or BTSs 102, if needed, for example, because of signal conditions. These changes are known as "handoffs," and they involve their own types of known messages and signaling.

Figure 2:
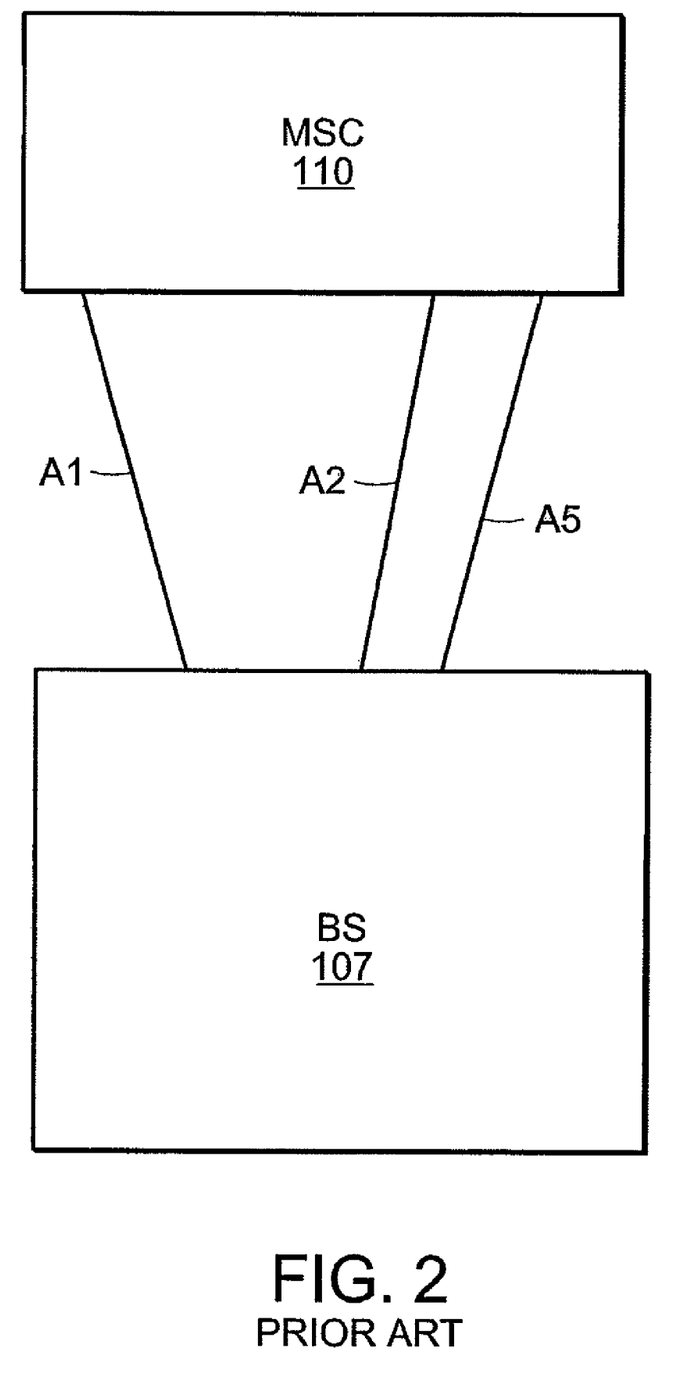

FIG. 2 shows in more detail the signaling and user traffic interfaces between a BS 107 and an MSC 110 in a CDMA mobile network. The BS 107 communicates signaling information using an SS7-based interface for controlling voice and data circuits known as the "A1" interface. An interface known as "A2" carries user traffic (such as voice signals) between the switch component 204 of the MSC and the BS 107. An interface known as "A5" is used to provide a path for user traffic for circuit-switched data calls (as opposed to voice calls) between the source BS and the MSC. Information about one or more of A1, A2, A5 may be found in CDMA Internetworking—Deploying the Open-A Interface, Su-Lin Low, Ron Schneider, Prentice Hall, 2000, ISBN 0-13-088922-9.

Mobile communications providers are supplying newer services, e.g., "data calls" to the Internet. For at least some of these services, MSCs are not cost effective because they were primarily designed for voice calls. Integration of new services into the MSC is difficult or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Integrating new services via MSC design changes or through trunk-side adjuncts can increase network congestion at the MSC and consume costly MSC resources.

Data calls typically make use of the Internet, which is an example of a packet-switching medium. A packet-switching medium operates as follows. A sequence of data is to be sent from one host to another over a network. The data sequence is segmented into one or more packets, each with a header containing control information, and each packet is routed through the network. A common type of packet switching is datagram service, which offers little or no guarantees with respect to delivery. Packets that may belong together logically at a higher level are not associated with each other at the network level. A packet may arrive at the receiver before another packet sent earlier by the sender, may arrive in a damaged state (in which case it may be discarded), may be delayed arbitrarily (notwithstanding an expiration mechanism that may cause it to be discarded), may be duplicated, and may be lost.

At least one wireless Internet system has been proposed that provides reliable access to tens of megahertz of bandwidth across a wide geographic area, using local wireless transceiver technology (e.g., in a nanocell system). In contrast to the cellular wireless voice system, which relies on tens or hundreds of cells in a region, the local wireless transceiver system relies on thousands or tens of thousands of transceivers in the region. In such a system, each transceiver may cover, e.g., 0.05 square kilometers, which is about one-hundredth the coverage of a conventional cell. High spatial reuse of the radio frequency (RF) spectrum allows the local wireless transceiver system to accommodate many more active devices at a given data rate than a conventional cell system. In addition, since users are closer to access points, the local wireless transceiver system accommodates lower-power transmissions. The local wireless transceiver system can support large numbers of devices, running at high speeds, with relatively little drain on the devices' batteries.

For example, in a citywide local wireless transceiver system network of 10,000 transceiver access points (cell centers), if each point provides its users with 1-Mb/s collective throughput, 10 active devices per transceiver can be supported at 100 kb/s each, which amounts to 100,000 active devices in the city. If each device is active 10 percent of the time, such a network can support a million devices, although some accounting would need to be made for bandwidth consumed by overhead for channel access, handoffs, and any provision for asymmetric traffic (e.g., in which more bits flow toward a device than from it).

Each local wireless transceiver system access point may be or resemble access points for wireless local area network (LAN) technology such as IEEE 802.11. An asynchronous digital subscriber line (ADSL), or a cable modem line may be used to provide a link between each access point and the Internet (a wireless link may be used as well or instead). With respect to the siting of access devices, since each device requires electrical power and is preferably elevated for adequate radio frequency coverage, sites on utility poles and buildings are typical candidates, with the high-speed neighborhood Internet access infrastructure serving as a backbone.

SUMMARY

In an aspect of the invention, a data and voice communication system includes communication between a line card and an accelerator card. Voice, data, and control traffic is received from the line card and is transmitted to the accelerator card via a physical link having separate voice, data, and control logical channels. The separate voice, data, and control logical channels are represented by labeled data packets.

Implementations of the invention may provide one or more of the following advantages. Communication can be provided between devices with incompatible bus interfaces on physically separate cards. TDM, Asynchronous Transfer mode (ATM), IP packet, and control data can be transmitted simultaneously or effectively simultaneously on logical separate channels within a link. Per logical channel flow control can be provided to independently control transfer of data over logical channels without causing head of line blocking. Round robin and strict priority servicing of channels can be provided, which can enable low latency traffic to be transferred with low jitter. One card (e.g., accelerator card) may communicate voice, data, and control traffic with multiple other cards (e.g., line cards). Redundant links used in conjunction with other resources can allow any combination of 1:n redundancy, depending on the implementation. A host CPU interface bus can be extended to access peripheral devices on another card using the control logical channel. Control plane and data plane migration can be facilitated during a redundancy switchover. Errors on redundant links or idling active links can be actively monitored and reported. Load sharing can be supported over multiple active links with an option to selectively steer traffic from one link to another link in case of one link failure.

Other advantages and features will become apparent from the following description, including the drawings, and from the claims.

DETAILED DESCRIPTION

Figure 3A:
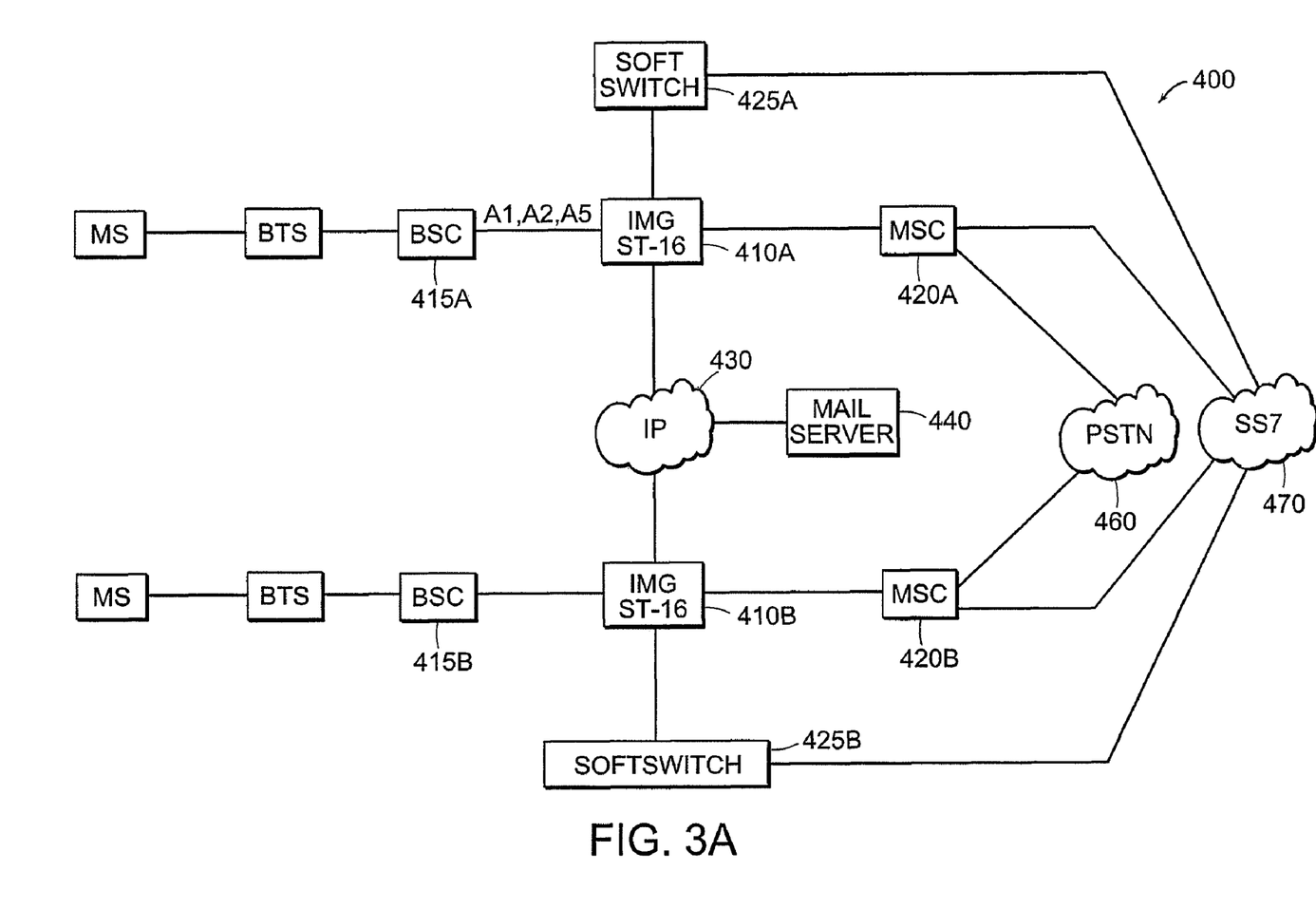
Figure 3B:
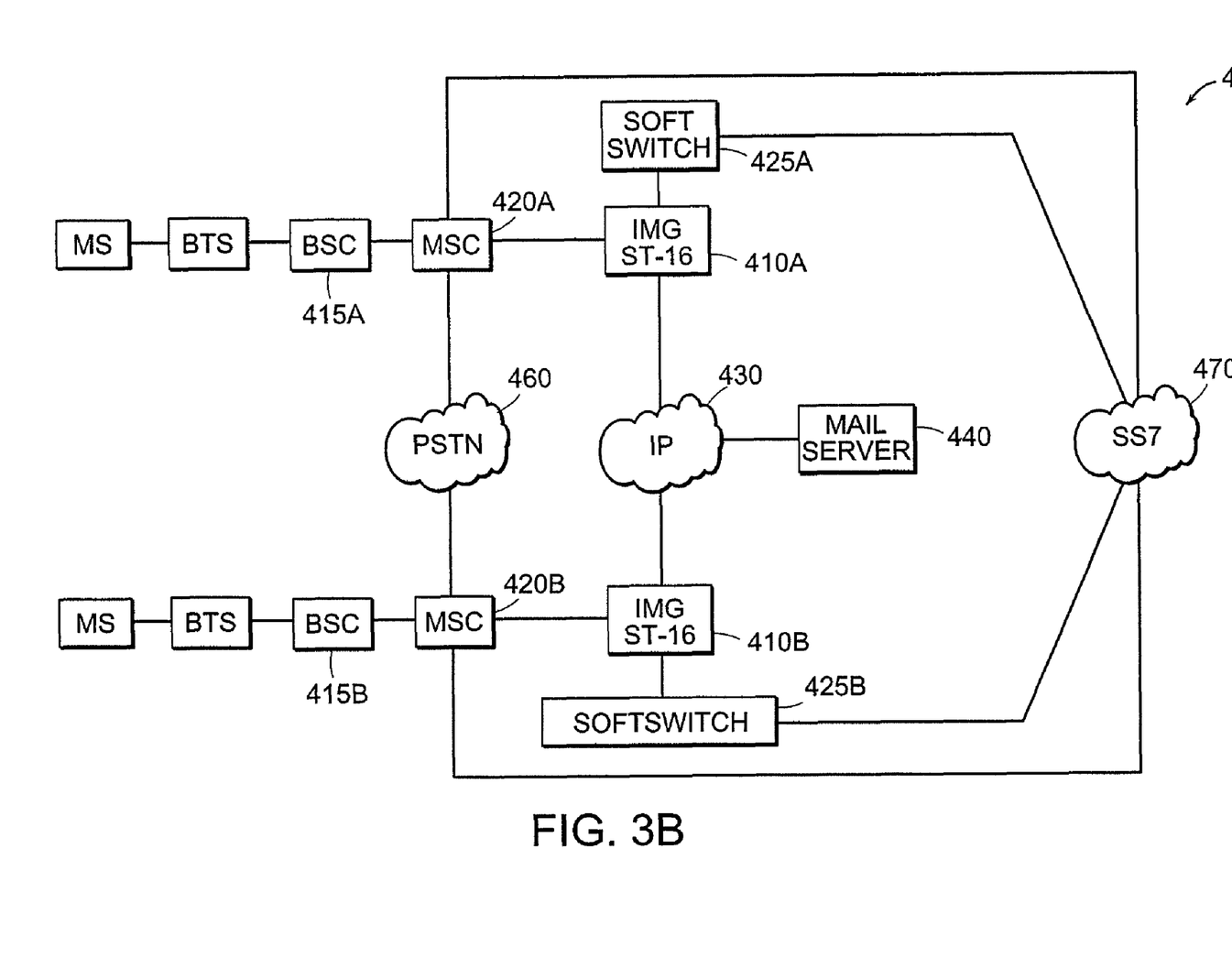

A communications system provides communications features including features relying on different types of data. The communications system has an Internet media gateway mechanism ("IMG") and a Softswitch mechanism as described below. FIG. 3A illustrates an example system 400 having an IMG 410A connected between BSC 415A and MSC 420A and communicating with a Softswitch 425A. IMG 410A communicates with BSC 415A by A1, A2, and A5 interfaces. As described below, Softswitch 425A coordinates pathway setup and communication between BSC 415A and MSC 420A through IMG 410A. IMG 410A also communicates with the Internet 430, through which IMG 410A is able to direct messages to a mail server 440, as described below. Other IMGs and Softswitches may be provided similarly in connection with other BSCs and MSCs as exemplified in FIG. 3A by IMG 410B, Softswitch 425B, BSC 415B, and MSC 420B. MSCs 420A, 420B are connected to, and can communicate with each other through, PSTN 460. SoftSwitches 425A, 425B are connected to, and can communicate with each other through, SS7 system 470. (FIG. 3B illustrates an alternative arrangement 402 in which MSC 420A is connected between IMG 410A and BSC 415A, and MSC 420B is connected between IMG 410B and BSC 415B.)

Figure 4:
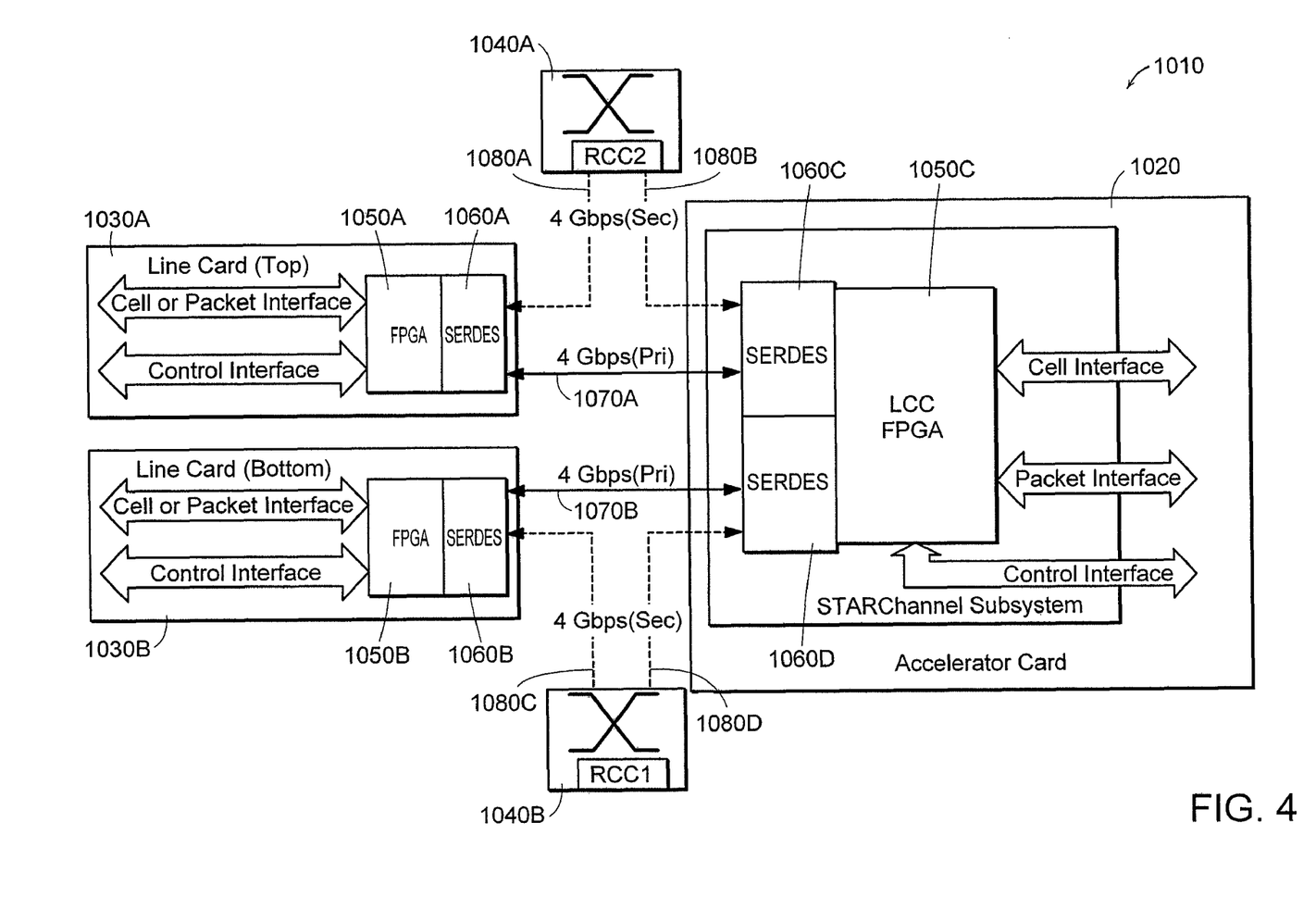

FIG. 4 illustrates a system 1010 that can support and help to provide voice and data services on one or more mobile wireless networks. In a particular implementation, system 1010 may include Starent Networks Corporation's ST-16 IMG product, which is a carrier class, high performance platform that can support multiple data types including time division multiplexed (TDM) data, Asynchronous Transfer mode (ATM) cell data, and Internet protocol (IP) packet data. The ST-16 architecture uses accelerator cards (e.g., card 1020) such as Packet Accelerator cards (PACs) for packet processing and Telephony Accelerator cards (TACs) for voice processing. Each PAC can perform data processing and each TAC can perform voice processing. In the ST-16, physical input/output (I/O) interfaces are terminated on industry standard line cards (e.g., cards 1030A, 1030B) and can carry TDM, packet or ATM cell data types in accordance with various physical interface standards. Since TDM interfaces primarily carry voice traffic, TDM line cards communicate with a TAC. Ethernet line cards carry packet data traffic and can communicate with a PAC. An optical line card supports ATM cells, which can carry both voice and data traffic, and can communicate with a PAC or a TAC. The ST-16 also has Redundant Crossbar Cards (RCCs) (e.g., cards 1040A, 1040B) which are used to allow a line card in any slot to communicate with an accelerator cards in any slot in the ST-16 (see copending U.S. patent application Ser. No. 10/638,550, now U.S. Pat. No. 7,558,193, entitled REDUNDANCY IN VOICE AND DATA COMMUNICATIONS SYSTEMS, filed Aug. 11, 2003).

The ST-16 uses a card to card communication system ("STARChannel") described below to provide links to connect the accelerator cards to the line cards and the RCCs. In an example implementation, a STARChannel link has 4.0 Gbps data capacity and includes two physical serial links operating in channel locked mode. Each physical serial link is clocked at 2.5 Gbps (8B/10B coded) and can carry 2.0 Gbps data.

Figure 5:
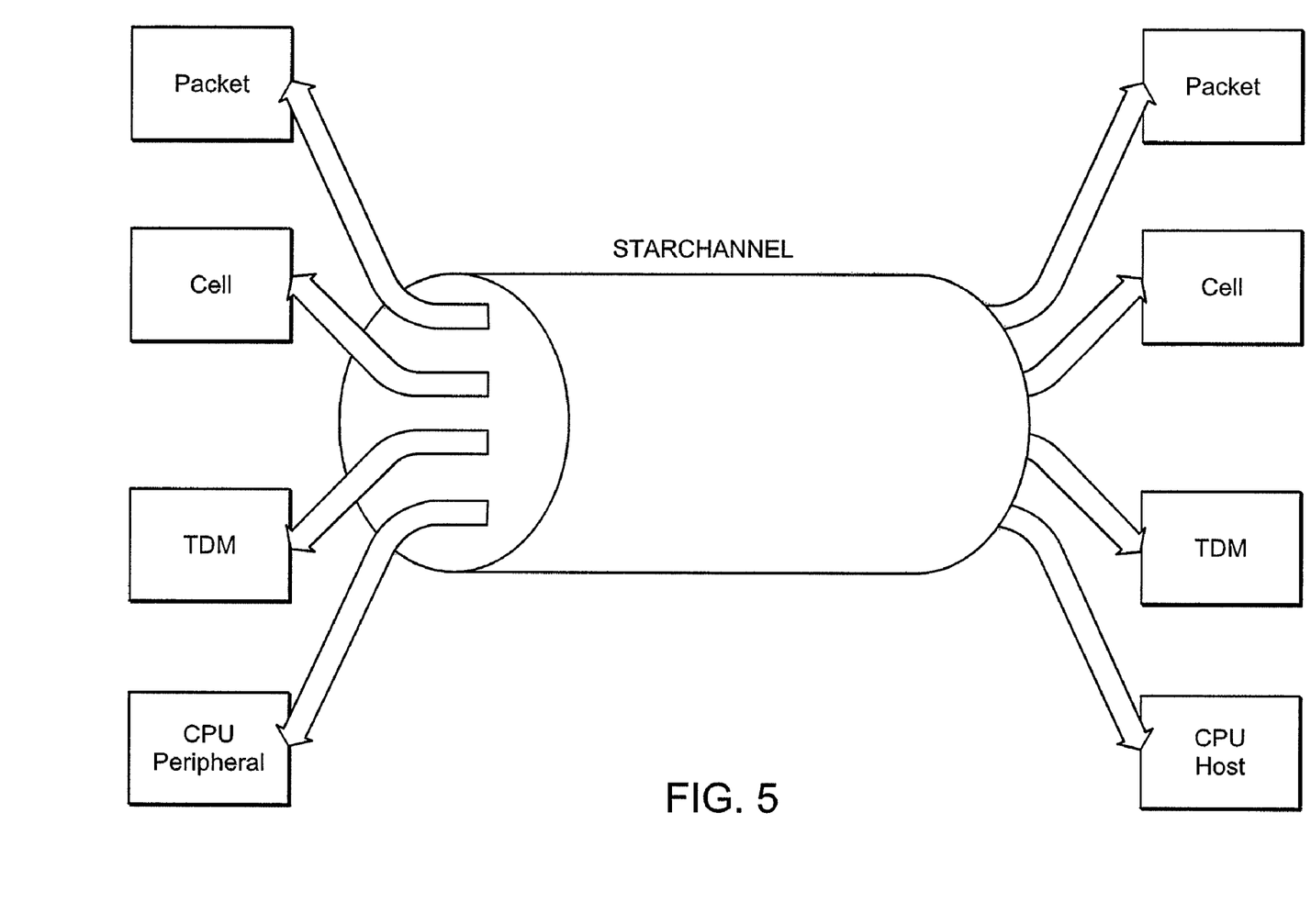
FIG. 5 is a diagram of a communications channel.

FIG. 5 shows a logical view of a single STARChannel link, which is able to carry voice, data and control traffic simultaneously in separate logical channels. The unit of transmission on the STARChannel link is a STARCell data structure cell ("STARCell"), described below. The STARChannel link uses a STARChannel protocol mechanism, also described below, to carry user data and control traffic between the line cards and accelerator cards and also provide 1:n redundancy support when used in conjunction with RCC cards.

Figure 6:
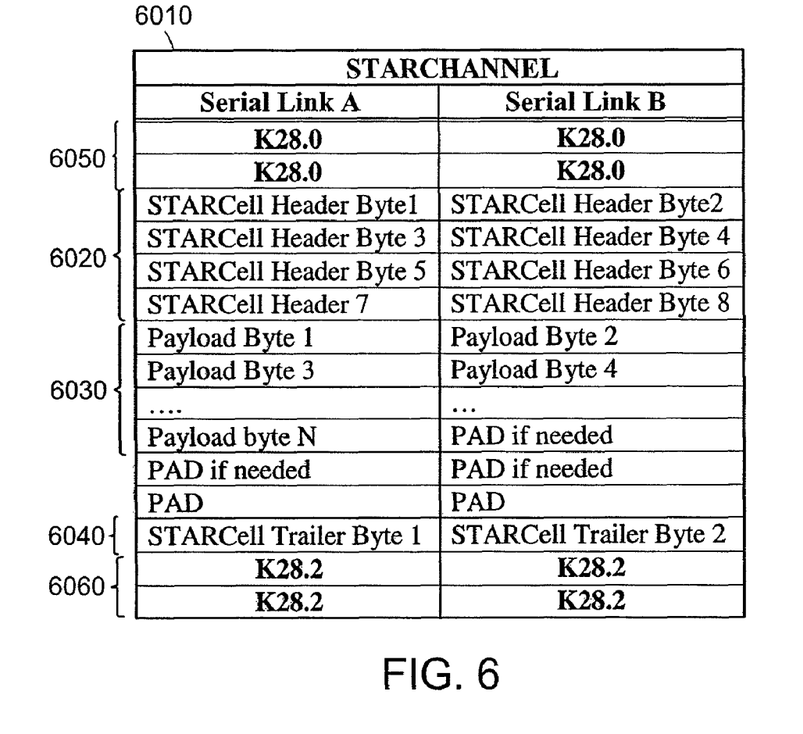
FIGS. 6-9 illustrate formats of a communications channel cells.
Figure 7:
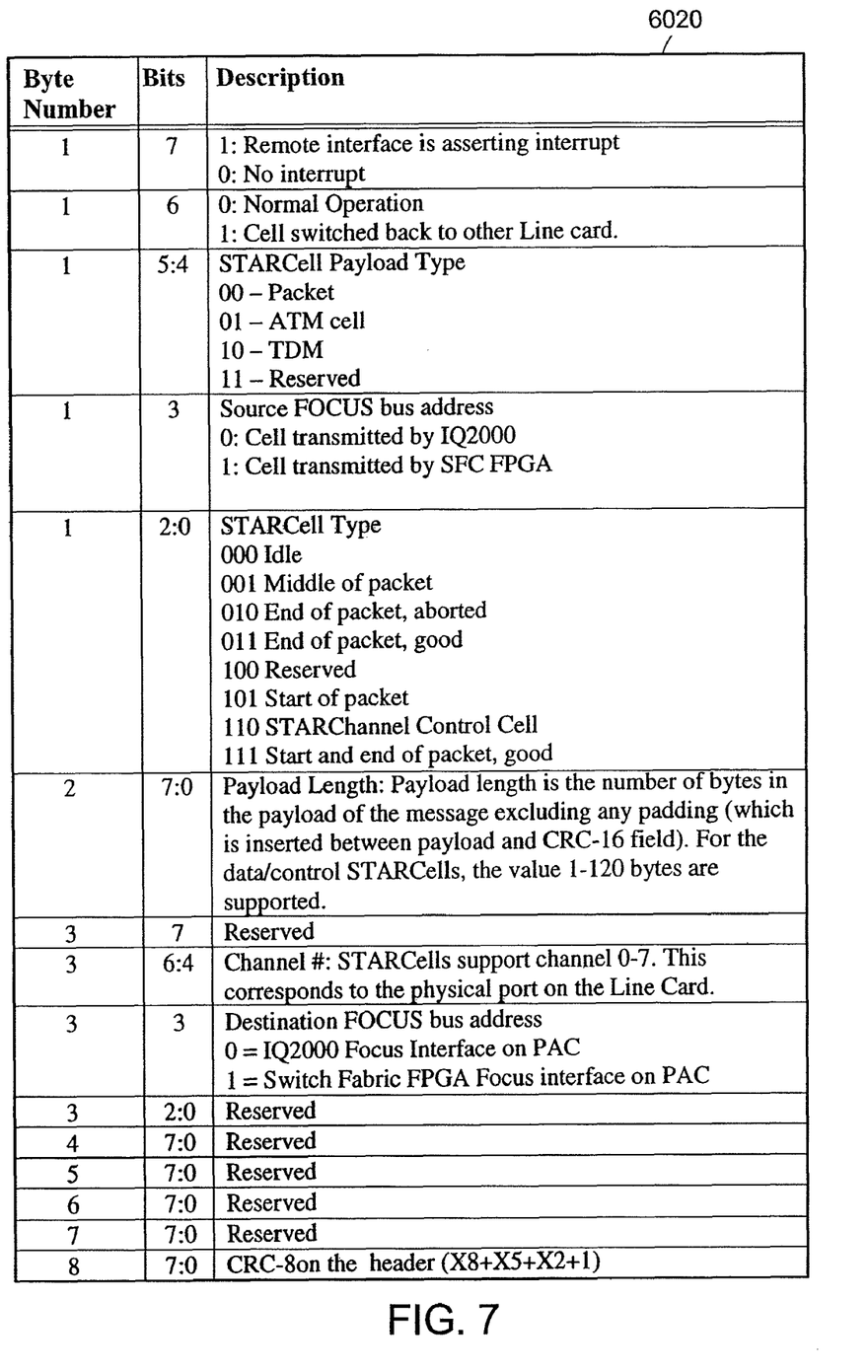

As shown in FIGS. 6-7, each STARCell 6010 includes a header field 6020, followed by a payload field 6030, and a trailer field 6040. The header carries information that uniquely identifies the cell on the STARChannel. The payload field carries the voice, data, or control traffic and the trailer field contains a cyclic redundancy check (CRC-16) over the payload field.

A system side interface of STARChannel supports a defined first in first out (FIFO) interface. Proprietary and standard bus interface standards can be used to communicate across STARChannel by providing the conversion to the standard STARChannel FIFO interface at each end of STARChannel system interface. Accordingly, two incompatible bus standards can be connected across physically separate cards and redundancy connection support can also be supported.

Since the STARChannel system uses a high-speed serial interconnect, a relatively small number of pins is required for a connector on a back plane of the ST-16 compared to a typical parallel bus interface. For example (see FIG. 4), STARChannel uses 16 pins to implement a full-duplex 4.0 Gbps rate with redundancy support, which would require 140 pins with a typical parallel bus format. The STARChannel system uses high-speed differential lines to signal data between two cards. The clock to sample the data at the receiver is embedded in the signal transmitted by the transmitter, which circumventing a need to separately route the clock from one card to another card.

In the ST-16, components of STARChannel are implemented on each of the line cards and each of the accelerator cards using a Field Programmable Gate Array (FPGA) (e.g., FPGAs 1050A-1050C) and Serializer/DeSerializer (SERDES) device (e.g., SERDES 1060A-1060D). The FPGA implements STARChannel link management functions, glue logic to convert from standard bus interface to STARChannel system side interface, SERDES command and data interfaces and control, status, and statistics for the STARChannel link. The SERDES provides the parallel-to-serial, serial-to-parallel, and 8B/10B encoding/decoding functions for the STARChannel system.

In the ST-16, the accelerator card in the front slot connects to two line cards in the corresponding slots on the back plane using primary STARChannel links (e.g., links 1070A, 1070B). A secondary set of STARChannel links (e.g., links 1080A-1080D) are used to connect to the RCC. The primary STARChannel links are used to directly connect the PAC and line card; the secondary STARChannel links are used to connect the PACs and the line cards through the RCCs.

In an example implementation, STARChannel includes the following features. STARChannel supports simultaneous transfer of TDM, ATM, IP packet, and control data on logical separate channels within the STARChannel link. Per logical channel flow control is provided to independently control transfer of data over logical channels without causing head of line blocking. Round robin and strict priority servicing of channels is supported, which enables low latency traffic to be transferred across the STARChannel link with low jitter. 2.5 Gbps of user data capacity are provided with transfer overhead over a 4.0 Gbps STARChannel link. One accelerator card may communicate with two line cards. Redundant STARChannel links used in conjunction with RCC allows any combination of 1:n redundancy (n<=13, depending on the implementation). A host CPU interface bus may extended to access peripheral devices on another card using the control channel on STARChannel. Control plane and data plane migration may be facilitated during a redundancy switchover. Errors on redundant STARChannel links or idling active STARChannel links are actively monitored and reported. Communication can be provided between devices with incompatible bus interfaces on physically separate cards. 1:1 redundancy can be supported between active and redundant STARChannel links. 1+1 redundancy support can be provided between two active STARChannel links. Load sharing can be supported over two active STARChannel links with an option to selectively steer traffic from one link to another in case of one link failure.

As shown in FIG. 6, in the example implementation, a STARCell includes an 8-byte header followed by payload and 16-bit CRC 16 field. Each STARCell is transmitted on the serial link encapsulated with Start of Frame K-Character (K28_0) 6050 and End of Frame K-character (K28_2) 6060. When there is no STARCell to transmit, an IDLE K-character (K28_5) is transmitted. When there is a change in link flow control or channel flow-control status, an XON/XOFF K-Character (K28_3/K28_4) followed by the per channel flow control bitmap is transmitted on STARChannel link.

FIG. 7 illustrates an example of the STARCell header format. The CRC-8 field carries the CRC for the first 7-bytes of the STARCell header and is present in the 8th byte of the STARCell header. The CRC-8 polynomial used is $x8+x2+x+1$. In the example, the 16-bit CRC-16 always occupies two-bytes. All padding is included in the CRC-16 calculations, and padding is always 32-bit word aligned. Further in the example, the CRC field is also 32-bit word aligned; hence two pad bytes are always added before the CRC-16 field. The CRC16 polynomial used is $x16+x12+x5+1$. The CRC-16 is calculated only on the payload of the STARCell.

The STARChannel link interface is big-endian and is 32-bit word aligned; hence there could be 2-5 bytes of pad data between last byte of the STARCell payload and the 2-byte CRC-16 trailer.

Figure 8:
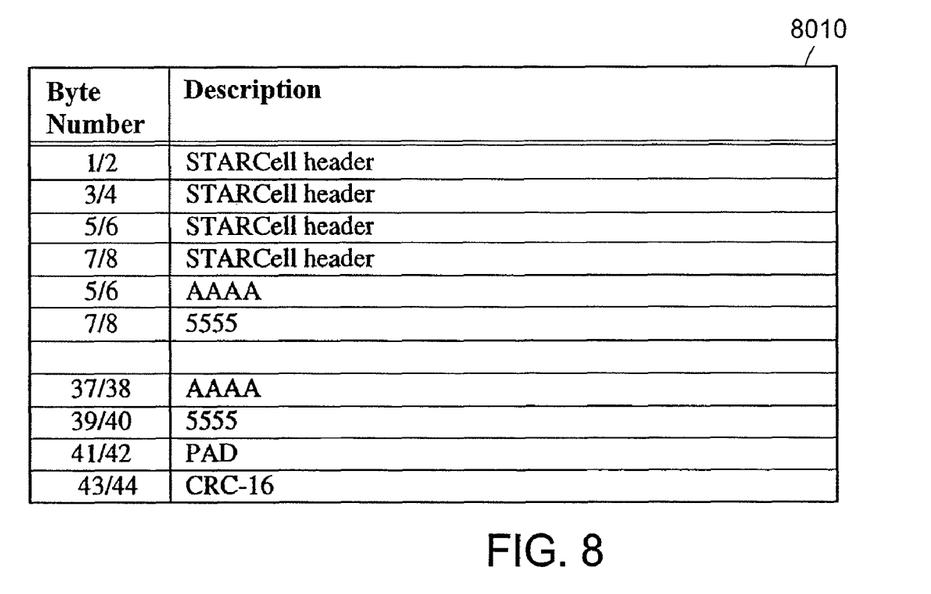

At least the following types of STARCell are supported in the STARChannel system as described below: an IDLE STARCell, a data STARCell, and a control STARCell. An IDLE STARCell is normally transmitted when there are no data STARCells to transmit. IDLE STARCells are normally used to monitor the redundant STARChannel links as well the active STARChannel link when there is no data being transferred on the link. As shown in FIG. 8, an IDLE STARCell 8010 includes the same 8-byte STARCell header followed by 32-bytes of an alternating "AAAA" and "5555" pattern in the payload followed by the CRC16 trailer. The type field is set to IDLE in the STARCell header.

The data STARCells are used to transport TDM, ATM, and IP packet data in STARChannel links. The payload type being carried by the data STARCell is identified in the STARCell header. Packet data is carried in units of STARCells, which can each carry a payload of 1-120 bytes. In the example implementation, ATM and TDM data STARCells are always carried in a single STARCell with the type field set to SEOP. Packet data may span a single STARCell or multiple STARCells. The STARCell type field indicates the sequence of cells in STARChannel. A normal data packet consists of a start of packet (SOP) STARCell, followed by zero or more middle of packet (MOP) STARCells, followed by an end of packet (EOP) good STARCell. In at least some cases, an entire short packet can be contained in a single SEOP STARCell.

Figure 9:
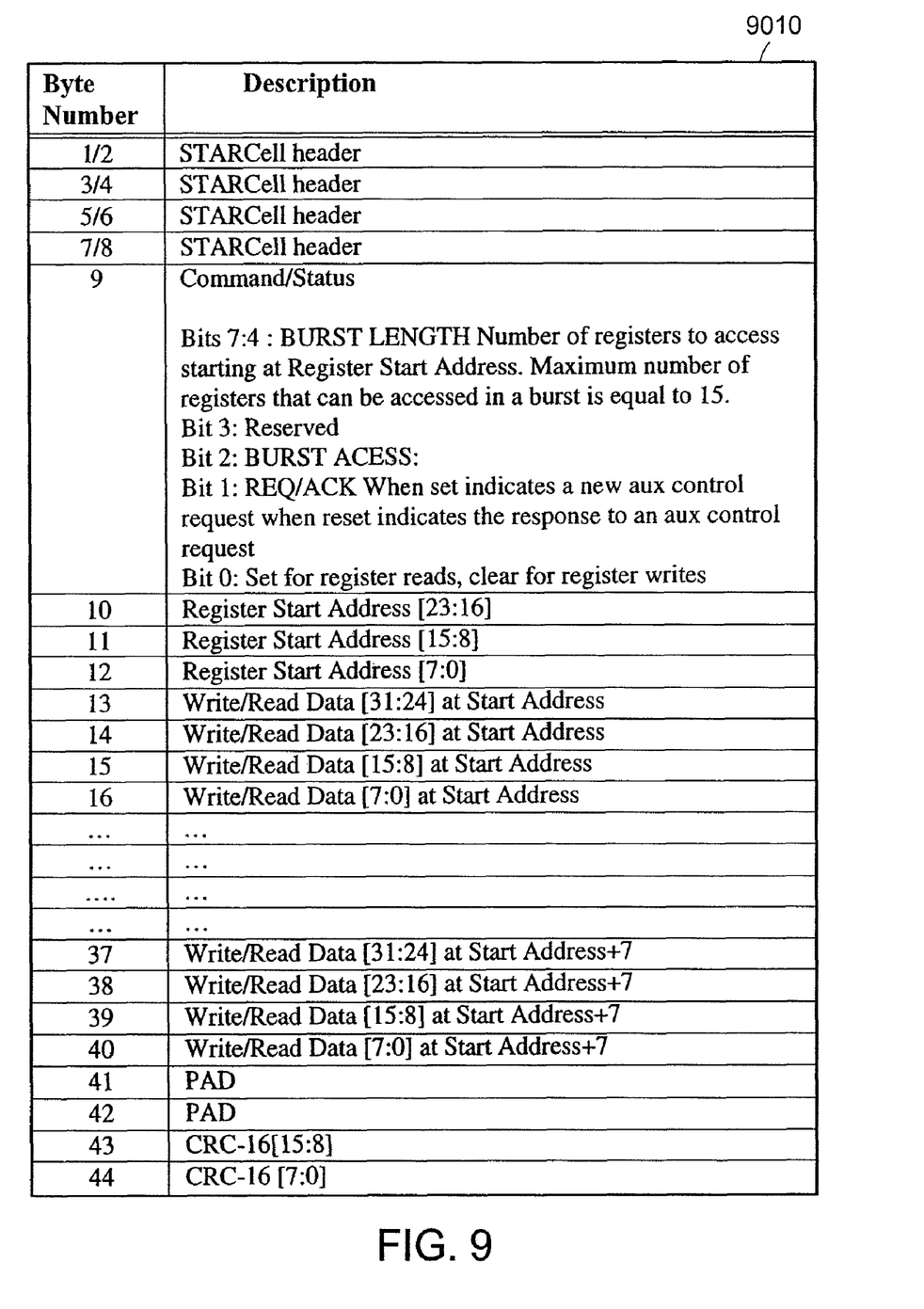

The control STARCells are used to access peripherals on line cards from a host processor on an accelerator card over the control channel of the STARChannel link. The control STARCELL includes a second layer of encoding in the STARCell payload to specify and access registers. Simple read write access as well burst read/write accesses are supported using a control cell format 9010 illustrated in FIG. 9.

The control STARCells may be used in accordance with a STARChannel control protocol that provides a generalized method of accessing command, status, and statistics registers within a peripheral chip by using a dedicated STARCell type. The control STARCells sent to or from the PAC to line card include a second layer of encoding to specify and control register accesses.

The control STARCells support simple read/write accesses to single registers in the line card or multiple accesses to consecutive registers starting at the address carried in the STARCell extended header. The extended header also indicates whether the current access is a burst access. The Burst length field defines the maximum burst size, which may be up to seven words. Seven STARChannel data registers, one address register, and one command register are provided.

For a write command, the STARCHANNEL_DATA registers are written first, followed by the STARCHANNEL_ADDRESS register. Execution of a write procedure to the STARCHANNEL_CMD register causes a control STARCell to be generated, which carries the address/data information to the line card. The COMMAND_DONE bit is reset. The line card performs a write procedure to the requested location and generates an ACK cell in response, to indicate that execution of the write procedure is completed, which causes the COMMAND DONE bit to be set in the STARCHANNEL_CMD register. Accordingly, the CPU monitors the COMMAND DONE bit to detect command completion before issuing another command on the STARChannel.

For a read command, the STARCHANNEL_CMDADDRESS register is written with a setting to cause the reading of a single register at the start address or multiple registers starting at the start address. The burst length defines the maximum number of registers to be read. A control STARCELL is sent to the line card and the COMMAND_DONE flag is reset. The line card returns the read results in a control STARCELL, in the DATA1 to DATA7 registers, and the COMMAND DONE flag is set in the CMDADDRESS register.

One or more situations described below can cause error conditions to occur on the STARChannel, which executes to handle these situations without causing a disruption of data transfer on the STARChannel link. With respect to FIG. 10, a first situation includes packet sequence errors: The header of each STARCell contains a 3-bit type field that indicates packet sequencing. A normal data packet consists of a SOP STARCell, followed by zero or more MOP STARCells, followed by EOP good STARCell. Sometimes an entire short packet can be contained in a single SEOP STARCell. A packet sequence error occurs when the normal STARCell sequence is violated.

Figure 10:
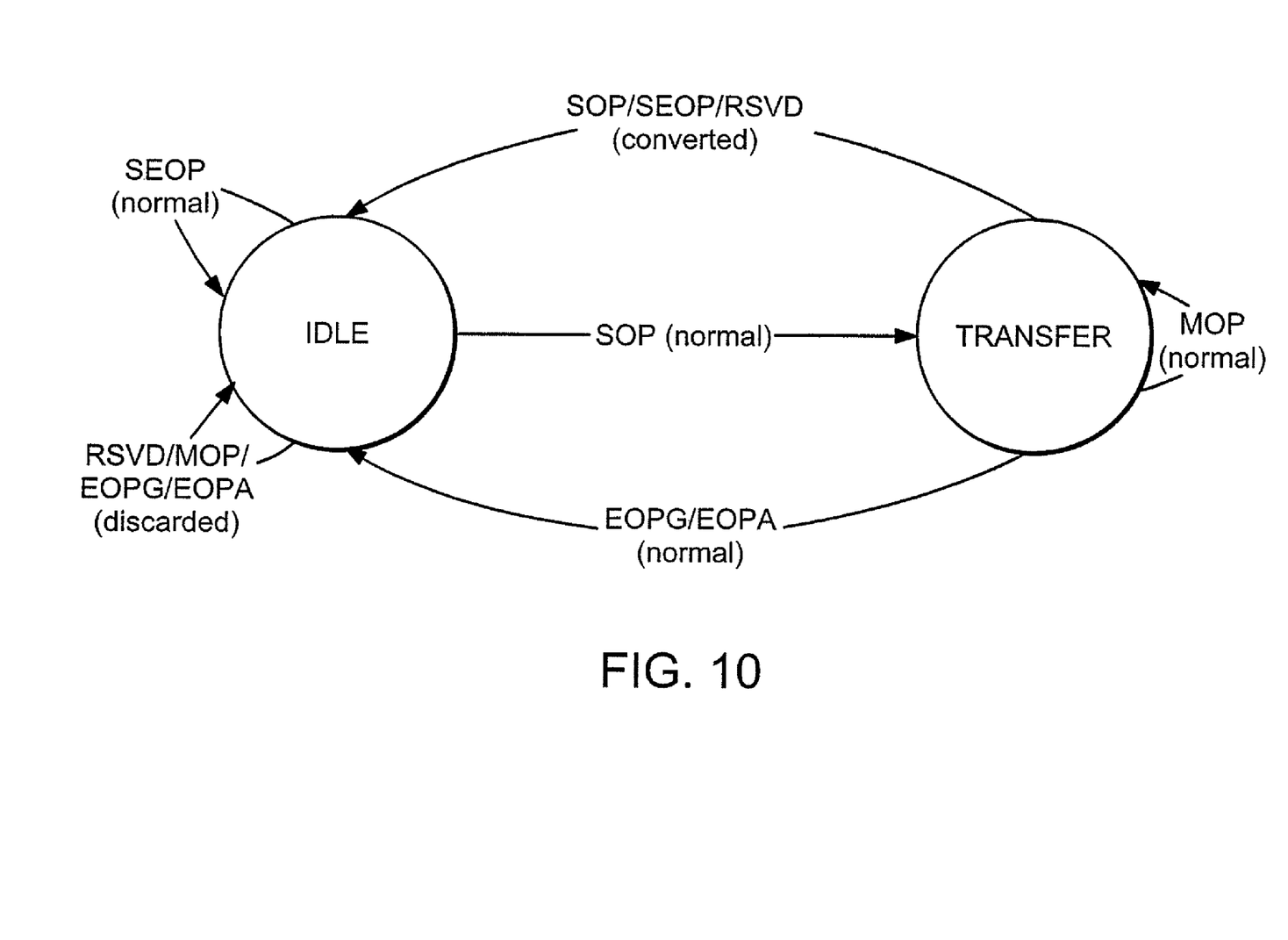
FIG. 10 illustrates error condition sequences on a communications channel.

In FIG. 10, non-normal sequences are indicated by "converted" and "discarded". In a "converted" case, the STARCell type is converted to End of Packet bad (EOPB). In a "discarded" case, the STARCell is not converted, and is simply discarded.

An invalid channel number may be found. In the example implementation, STARChannel implements 8 data channels (0 to 7). If a STARCell is received on unsupported channel number, the STARCell is dropped.

A flow control error may be found. If the STARChannel receives a STARCell on a channel for which it has no receive buffers, the STARCell will be dropped.

A STARCell header error may be found. If a CRC-8 checksum error is detected over the 8-byte STARCell header, the STARCell is dropped.

A STARCell payload error may be found. If a CRC-16 checksum error is detected over the STARCell payload, the STARCell is dropped.

In the example implementation, STARChannel maintains statistical counters, including the following:
1. Per Channel Transmit and receive STARCell count.
2. Per Channel Discarded and Converted STARCell count
3. Overflow error, Invalid error, CRC-8 error, CRC-16 error
4. Number of IDLE and Control STARCells transmitted and received per STARChannel link.

The example implementation of the STARChannel link supports flow control mechanisms including channel flow control and link flow control. In the case of channel flow control, STARChannel maintains a per channel receive queue and a per channel transmit queue. If the receive channel queue passes a threshold corresponding to an "almost full" level, the local transmitter asserts the flow control bit for the corresponding channel to the remote receiver. The remote receiver receives the flow control bit and instructs the remote transmitter to stop transmitting on the flow-controlled channel.

In the case of link flow control, a link first in first out mechanism (FIFO) is implemented per STARChannel interface and a link level flow control mechanism is implemented to maintain receive overflows in the link FIFO. When two STARChannel devices running at considerably different speeds are communicating with each other, it is possible for the link FIFO to fill up before the channel flow control is asserted. If so, this condition is reported to the remote transmitter using a K-character XON/XOFF flow control sequence. When an XOFF K-Character (K28_4) is received, the transmitter stops transmitting STARCells. When an XON K-Character (K28_3) is received, the transmitter starts sending STARCells.

In the example implementation, STARChannel also supports loopback modes including STARChannel local line loopback, STARChannel remote loopback, STARChannel local facility loopback, and STARChannel remote facility loopback. In the case of STARChannel local line loopback, data received on the system interface of the accelerator card is looped back at the local serial transmit interface on accelerator card.

In STARChannel remote loopback, data received on the system interface of the accelerator card is looped back at the STARChannel system interface on the line card.

Data received on the system interface of the line card in STARChannel local facility loopback is looped back at the local serial transmit interface on line card.

In the case of STARChannel remote facility loopback, data received on the system interface of the line card is looped back at the STARChannel system interface on the accelerator card.

The technique (including one or more of the procedures described above) may be implemented in hardware or software, or a combination of both. In at least some cases, it is advantageous if the technique is implemented in computer programs executing on one or more programmable computers, such as a system using a network processor solution from SiByte, Inc., a general purpose computer, or a computer running or able to run Microsoft Windows 95, 98, 2000, Millennium Edition, NT, XP or other Microsoft operating system; Unix; Linux; or MacOS; that each include a processor such as an Intel Pentium 4, a storage medium readable by the processor (including volatile and non-volatile memory and/or storage elements), at least one input device such as a keyboard or a voice input device (which may include a microphone), and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C, C++, Java, or Perl to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, communication between cards may be provided in whole or in part by wireless communications systems. Packets, fields, or sets of bits may have variable lengths.

We claim:

1. A communication system comprising:
   a first card that is configured to provide input and output interfaces, wherein the first card is configured to receive data over the interfaces in accordance with one of a plurality of communication protocols, which includes at least an internet protocol (IP) packet protocol, and is interconnected with a link;
   a second card that is interconnected with the link to the first card;
   the first card configured to send the received data in a data structure cell to the second card over the link in one of a plurality of logical channels, wherein the plurality of logical channels are configured to transfer at least a plurality of communication protocols and control data over the link; and
   the second card configured to receive the data structure cell from at least the first card, wherein the each of the data structure cells include a payload field that carries a payload in accordance with the plurality of communication protocols and a header field that carries information including a cell type, a payload type, a sequence indication, and a payload length, and wherein:
      the cell type indicates whether the data structure cell is configured as a control cell, an idle cell, or a data cell, the control cell configured to provide at least one of commands and status information about the first card to the second card, the idle cell configured to indicate that there is no data to transmit over the link, and the data cell configured to carry the received data formatted in accordance with one of the plurality of communication protocols;
      when the data structure cell is a data cell, the cell type further includes the sequence indication that indicates an arrangement of the received data across one or more data structure cells;
      the payload type indicates the one of the plurality of communication protocols according to which the payload is formatted; and
      the payload length indicates the length of the payload.

2. The communication system of claim 1, wherein the payload data is at least one of internet protocol (IP) packet data, asynchronous transfer mode (ATM) cell data, and time division multiplexed (TDM) data.

3. The communication system of claim 1, further comprising a channel number field that indicates a logical channel over the link.

4. The communication system of claim 1, wherein the first card includes a line card.

5. The communication system of claim 1, wherein the idle cell is used to monitor the link.

6. The communication system of claim 1, wherein the payload field of the control cell includes encoding to specify and access registers from the second card, the access registers residing in the first card.

7. The communication system of claim 1, wherein the second card includes a packet accelerator card for processing packet data.

8. The communication system of claim 1, further comprising the first card including glue logic to convert from a standard bus interface to the data structure cell for transmission on the link and providing encoding functionality.

9. A method of exchanging data the method comprising:
   receiving data over a link at a first card in accordance with one of a plurality of communication protocols, including at least an internet protocol (IP) packet protocol, wherein the data is received over the link in one of a plurality of logical channels, wherein the plurality of logical channels are configured to transfer at least a plurality of communication protocols and control data over the link in a data structure cell;
   sending data structure cells over the link from the first card, wherein each of the data structure cells includes a payload field that carries a payload in accordance with the plurality of communication protocols and a header field that carries information including a cell type, a payload type, a sequence indication, and a payload length;
   providing the cell type, wherein the cell type field indicates whether the data structure cell is configured as a control cell, an idle cell, or a data cell, the control cell configured to provide at least one of commands and status information about the first card to the second card, the idle cell configured to indicate that there is no data to transmit over the link, and the data cell configured to carry the received data; and
   wherein when the data structure cell is a data cell,
      providing a payload type in the data structure cell to indicate the one of the plurality of communication protocols according to which the payload is formatted;
      providing a sequence indication using the cell type field to indicate the arrangement of the received data across one or more data structure cells; and
      providing a payload length indication in the data structure cell to indicate the length of the payload.

10. The method of claim 9, wherein the payload data includes at least one of internet protocol (IP) packet data, asynchronous transfer mode (ATM) cell data, and time division multiplexed (TDM) data.

11. The method of claim 9, further comprising providing a channel number in the data structure cell that indicates a logical channel over the link.

12. The method of claim 9, wherein the first card includes a line card.

13. The method of claim 9, wherein the idle cell is used to monitor the link.

14. The method of claim 9, wherein the payload of the control cell includes encoding to specify and access registers from a second card that is coupled to the first card via the link, the access registers residing in the first card.

15. The method of claim 9, receiving data over the link at a second card in at least one of a plurality of logical channels, wherein the second card includes a packet accelerator card for processing packet data.

16. The method of claim 9, further comprising converting, using glue logic, from a standard bus interface to the data structure cell for transmission on the link.

17. Logic encoded on one or more non-transient tangible media for execution and when executed operable to:
   send and receive a data structure cell that carries payload data formatted according to one of a plurality of communication protocols, which includes at least an internet protocol (IP) packet protocol, over a link in one of a plurality of logical channels, wherein the plurality of logical channels are configured to transfer at least a plurality of communication protocols and control data over the link in a data structure cell;

format each of the data structure cells to include a header field that carries information including a cell type, a payload type, a sequence indication, and a payload length, wherein:

the cell type indicates whether the data structure cell is configured as a control cell, an idle cell, or a data cell, the control cell configured to provide at least one of commands and status information, the idle cell configured to indicate that there is no data to transmit, and the data cell configured to carry payload data formatted in accordance with one of the plurality of communication protocols; and when the data structure cell is a data cell, the cell type further includes the sequence indication that indicates an arrangement of the payload data across one or more data structure cells;

the payload type indicates the one of the plurality of communication protocols according to which the payload data is formatted; and the payload length indicates the length of the payload data.

18. The logic of claim 17, wherein the plurality of communication protocols includes an asynchronous transfer mode (ATM) protocol, a time division multiplexing (TDM) protocol, and an internet protocol (IP) packet protocol.

19. The logic of claim 17, wherein the data structure cell carries a channel number that indicates a logical channel over the link.

* * * * *